July 29, 1958   W. J. PRICE ET AL   2,844,989
MEANS FOR MEASURING SMALL DEGREES OF OPTICAL DENSITY
Filed Sept. 12, 1955   5 Sheets-Sheet 1

INVENTORS
WILLIAM J. PRICE,
ALFRED MAYER
BY
Almon S. Nelson
ATTORNEY

July 29, 1958 W. J. PRICE ET AL 2,844,989
MEANS FOR MEASURING SMALL DEGREES OF OPTICAL DENSITY
Filed Sept. 12, 1955 5 Sheets-Sheet 3

INVENTORS
WILLIAM J. PRICE &
ALFRE MAYER
BY
ATTORNEY

INVENTORS
WILLIAM J. PRICE &
ALFRED MAYER
BY
ATTORNEY

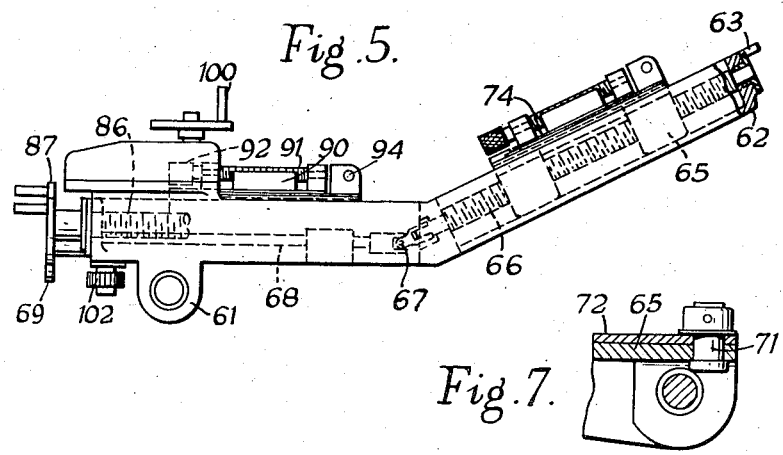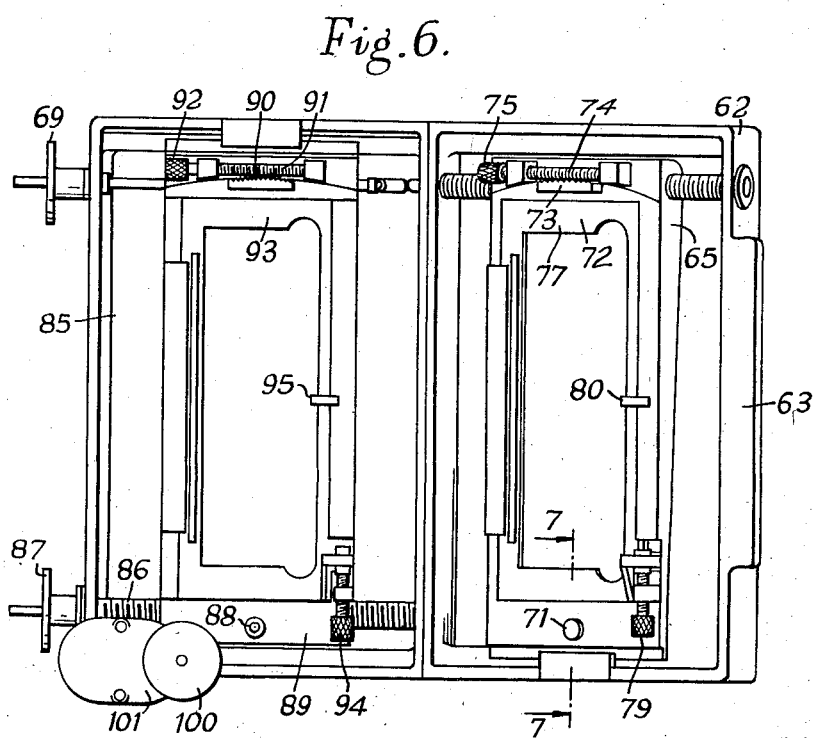

United States Patent Office 2,844,989
Patented July 29, 1958

2,844,989

MEANS FOR MEASURING SMALL DEGREES OF OPTICAL DENSITY

William J. Price and Alfred Mayer, Clifton Junction, Manchester, England, assignors to Magnesium Elektron Limited, Clifton Junction, Manchester, England Application September 12, 1955, Serial No. 533,554

Claims priority, application Great Britain September 15, 1954

2 Claims. (Cl. 88—14)

The present invention relates to means for measuring degrees of optical density especially for deriving analytical results from photographic spectrograms. These spectrograms commonly consist of a photographic plate size 10 inches wide by 4 inches height across which are a number of spectrograms each occupying about one millimeter of height and corresponding to the spectra of the alloys or other materials under examination. It is particularly desirable to examine those lines in the spectrograms which correspond to traces of elements.

The methods employed for deriving analytical results from spectrograms may be divided into two categories, viz. methods depending upon visual comparison of sample spectra with the spectra of known standards and those utilizing photometric measurements of actual line densities.

Visual methods call for the use of spectrum viewers, comparators, or projectors, and the accuracy obtainable is not utually better than ±50% of the actual concentration being estimated, although in a longer method using a logarithmic sector an accuracy of about ±8% is claimed. This method is described by G. H. Metson in Post Office Electrical Engineering Journal, 25, 143–147 (1932).

Considerably increased accuracy is obtained over a large part of the density range by using photometric density measurements. The normal error inherent in the instrument employed when considered solely as a light measuring device is less than ±1% and the analytical accuracy obtained is generally not better than ±1.5% depending upon the quality and method of processing of the photographic emission used. However, mathematical computations are always involved and the time consumed in reaching the analysis figure is comparatively great. The still greater disadvantage of photometric measurement of densities is that in the low density range, that is, at optical densities below 0.05, the analytical accuracy rapidly falls off because of the proportionality effect of incurred errors. Better accuracy in the low density range may be obtained by using an instrument known as the display- or cathode-ray-photometer.

The main object of the present invention is to provide a device whereby any two spectra on any two plates, e. g. the spectrum of a sample under investigation and a standard or reference spectrum, can be projected side by side for the purpose of visual examination and analysis to specification limits, and at the same time enables the density of at least one of these spectra to be measured by cathode ray photometry.

A further object of the invention is to provide a display comparator which will therefore have the combined advantages of projection-comparators and display-photometers so as to be suited for trace analysis. The invention consequently possesses the important advantage, that the lines which are interfered with by other closely situated lines, or even lines which are invisible to the naked eye, can be readily positioned and detected and therefore these can be positively identified and measured.

The invention will now be described by way of example with reference to the accompanying diagrammatic drawings wherein:

Figure 5 is a view of part of Figure 3 on an enlarged scale;

Figure 6 is a plan view of the part shown in Figure 5;

Figure 7 is a sectional view on the line 7—7 on Figure 6;

Figure 1:
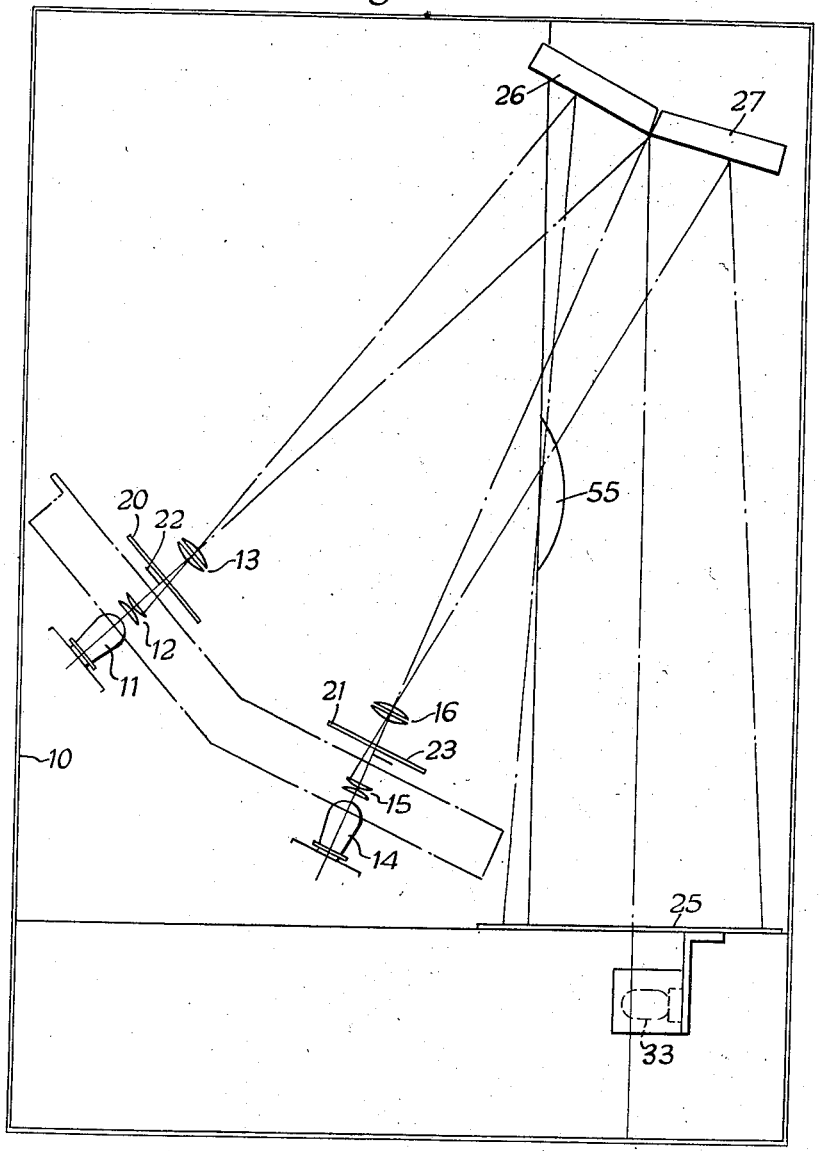
Figure 1 is a side view showing the main elements of an apparatus made in accordance with the invention.

A casing or frame 10 carries the various parts. The instrument consists essentially of the following parts:

(i) Double sepectrum projector.
(ii) Profiling mechanism.
(iii) Oscilloscope.
(iv) Stabilised power supply for phototube, oscilloscope and projector light source.

(i) The double spectrum projector consists of two spectra projector units one of which comprises a 48 watt projector lamp 11, a 1″ focal length condenser lens 12, and a 2″ focal length $f/3.1$ projector lens 13. The other unit comprises a similar lamp 14, condenser lens 15, and projector lens 16.

The two projector lamps are connected in series. A pair of independently movable plate-stages to be described adapted to carry photographic plates 20, 21 make it possible for any part of a plate or film on one stage to be projected simultaneously with any part of a plate or film on the other stage. Masks 22, 23 placed between the condenser lens and the plates or films give a correct image size and ensure a linear demarcation between the projected images.

The complete projection system is placed behind a white opaque horizontal viewing screen 25, the two units being inclined to each other and to the screen at such an angle that the projection beams are thrown upwards and forwards on the two front-surface reflecting mirrors 26, 27, which reflect the beams vertically downwards to a focus on the viewing screen 25. The angles of the inclinations of the projection system and mirrors are chosen so that the centre rays of the two beams are as nearly co-linear as possible from the mirrors to the screen.

Figure 8:
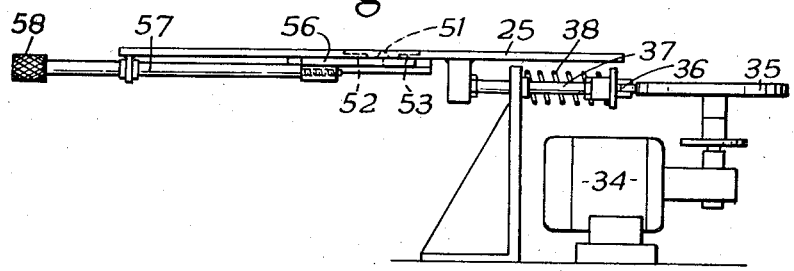
Figure 8 is an enlarged view of a part of Figure 4.
Figure 3:
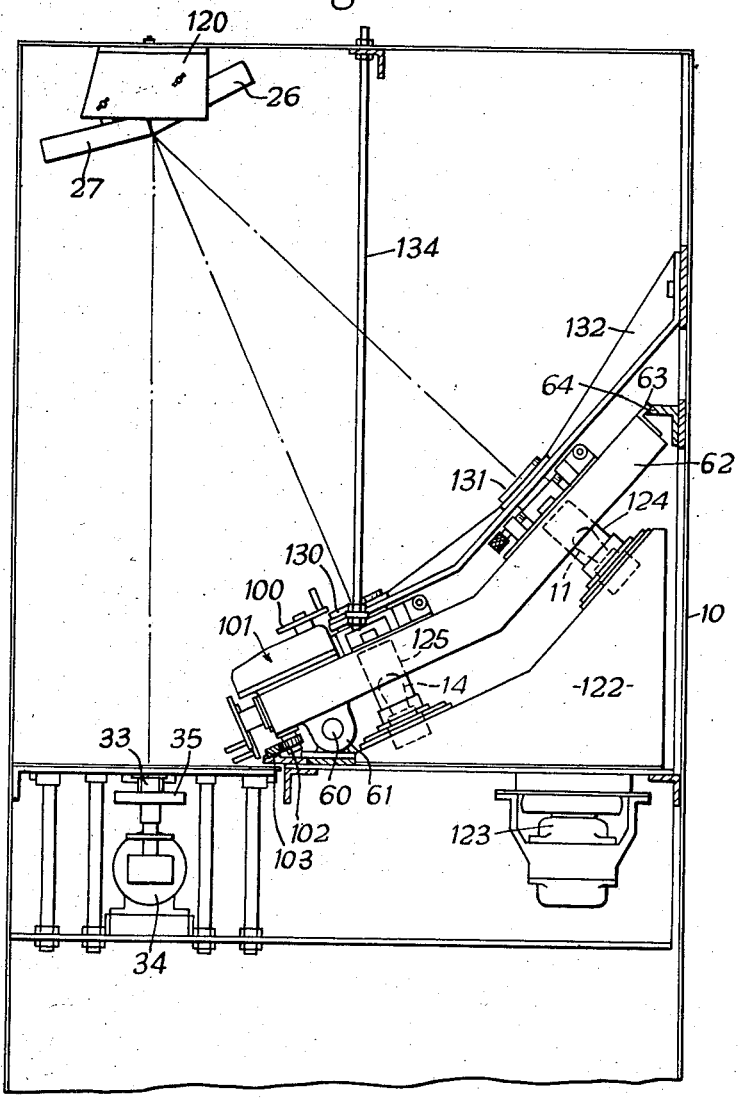
Figure 3 is a side elevational view of an apparatus (known as a "display comparator") made in accordance with the invention.
Figure 4:
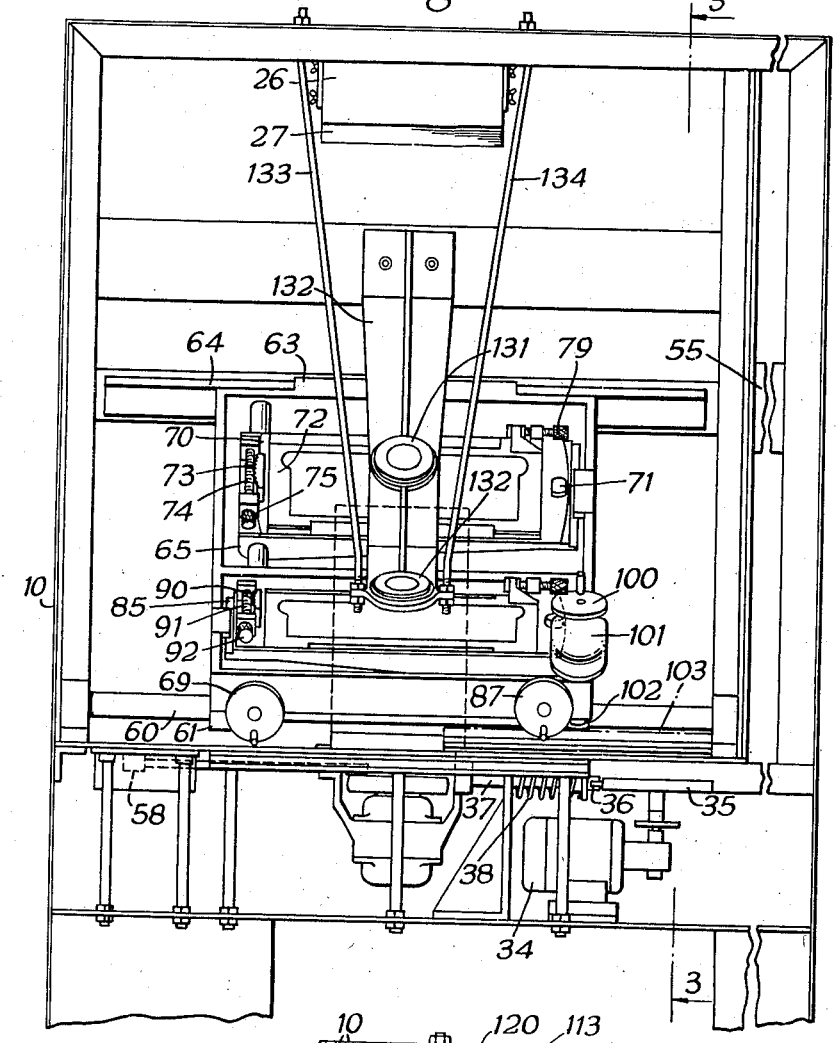
Figure 4 is a front view thereof.

(ii) Profiling of the spectrum may be achieved in one of several different ways. In each of these an image of the spectrum is made to move laterally with respect to a narrow slit 51 in the screen 25 positioned parallel to and made shorter than the spectrum lines. Behind the slit is positioned a light-sensitive device for translating the light intensity incident upon the slit into an electrical current for feeding to the oscilloscope. Such means of profiling are:

Conveniently positioned in a recess in the viewing screen 25 is a pair of steel plates 52, 53, spaced apart to form the slit 51 of say 100 microns width. Beneath the screen is fixed a vacuum photocell or electron multiplier phototube 33. The output from the photocell or phototube is fed to the Y-plates of a single beam oscilloscope 55. Profiling is achieved by imparting to the screen 25 with the slit and phototube assembly a low frequency reciprocating motion in a direction at right angles to the spectrum lines by means of an electric motor 34 which drives a cam 35 that actuates the screen through an anti-friction roller 36, rod 37, and spring 38. The frequency of the motion is fed to the X-plates of the oscilloscope as the time base. The operative length of the slit can be adjusted by a sliding plate 56 (Figure 8) having a V-opening therein and which is adjustable by a screw 57 and knob 58.

The viewing screen 25 is made to reciprocate at a frequency of about one half to one cycle per second. The amplitude of the movement is of the order of about 1". The screen slides on accurately machined low friction bearing surfaces. Mounted on the under-side of the screen are the slit and phototube assembly. This slit is placed centrally and in the forward half of the screen. Its dimensions are approximately: width 100 microns, length variable between 0–1".

The phototube (gas-filled type GS16) is attached to the screen immediately beneath the slit so that the light passing through the slit falls upon its photosensitive cathode. Electrical connections to the phototube are made through flexible coaxial cables.

(iii) The oscilloscope 55 comprises stabilized X- and Y-gain amplifiers, constructed from published circuits (e. g. Spectrochimica Acta cited above) and a long-afterglow cathode ray tube. The time base is provided by a slide wire potentiometer with sliding contact fixed to the screen. The Y amplifiers are fed direct from the photocell output. The cathode ray tube flyback suppression is operated by a cam switch on the screen drive spindle.

(iv) The phototube, oscillating amplifiers and projector light sources are all fed through a suitable stabilized power supply.

The operation of the apparatus is as follows:

For qualitative work the instrument is used in the same way as any other spectrum comparator, e. g. instruments 2 and 4 above.

For quantitative work the method relies upon the linear relationship which exists at low density levels between the height of an impurity line profile above its adjacent background level and the concentration of the element giving rise to that line. The method is given in detail in the Davis/Webb paper.

The slit 51 moves across the spectrum line 32 under examination from one side to the other and back again repeatedly with the reciprocation of the screen, and the curve shown on the cathode ray tube rises from a minimum corresponding to the photographic background density to height indicating the degree of optical density of the spectrum line and down to the minimum. At low densities the height of the impurity line profile is proportional to the concentration of impurity present at constant general spectrum density. Hence a form of the well known "internal standard" method may be employed for evaluation of trace elements, using line profile heights instead of line intensities.

Figure 2:
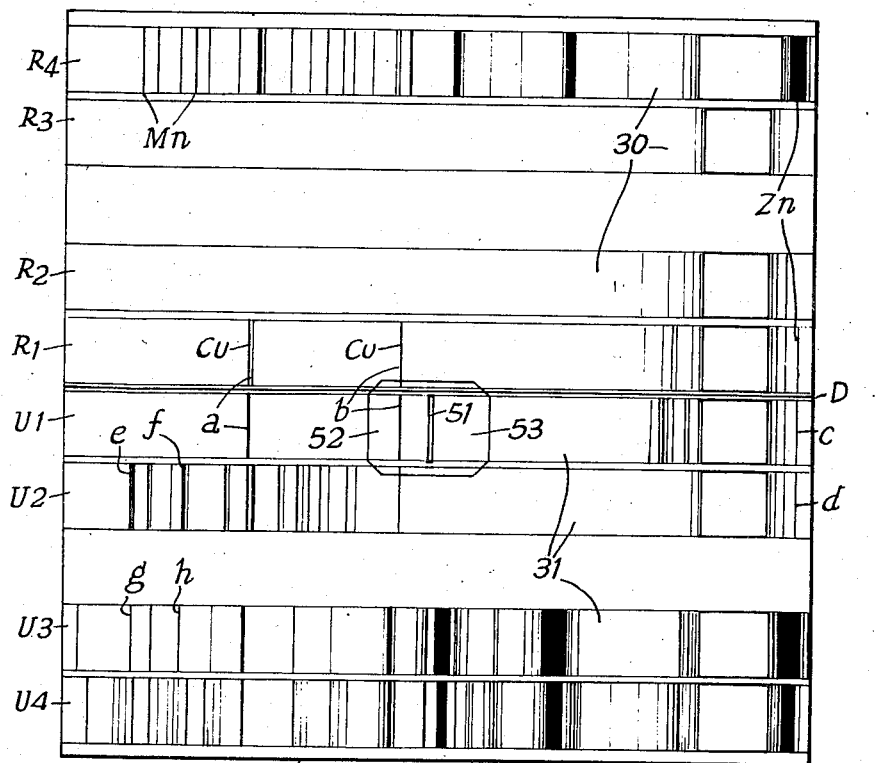
Figure 2 is a plan view of the screen.

Figure 2 shows an example of what may be seen on the screen.

D is the dividing line between the projected parts of a plate containing the reference spectra R1, R2, R3, R4, and a plate of spectra of unknown samples U1, U2, U3, U4.

It will be understood that for example the copper lines (marked Cu at $a$ and $b$) in spectrum R1 appear in all the spectra U1, U2, U3, U4. In particular, if it is desired to estimate the amount of copper in the sample corresponding to U1, the plates are set so that the slit reciprocates over the line marked $a$ or $b$ on U1, thereby obtaining a measure of its blackness density as a profile on the cathode ray tube. The blackness density value obtained would be compared with corresponding values obtained from standardized samples.

R4 is a spectrum showing a large amount of zinc (Zn), and similarly it is inferred that U3 and U4 also have large amounts of zinc. A fine zinc line also appears in R1, and is even less apparent in U1 and U2 at positions $c$ and $d$.

It would be very difficult to measure $c$ and $d$ using normal technique, but they will show a definite profile with the apparatus of the present invention. This illustrates how a line can be detected and evaluated when it is barely visible or even invisible to the naked eye. A similar example is afforded by the manganese lines which appear strongly in reference spectrum R4 (marked Mn). Lines $e$ and $f$ show a high concentration of manganese in U2, but it is not at all apparent at first sight that these lines are present also at $g$ and $h$ in U3 and U4. This would be far more convincing on the instrument, of course, because the spectra U3 and R4 would be brought into juxtaposition, as are U1 and R1 in Figure 2.

A further development of the principle of the display-comparator is as follows:

By employing two co-linear slits in the screen, one in the front half of the screen and the other in the rear half and each with its own phototube, by duplicating the amplification system and employing a double-beam cathode-ray tube, the density profile of both standard and unknown spectra can be displayed simultaneously. Such a system may have an advantage over the single beam system described hereinbefore when it is desired to compare two spectra quantitatively and directly, and without previously establishing the profile-height/concentration relationship.

Referring to the particular construction illustrated in Figures 3 to 8, the frame 10 carries a bar 60 on which slide lugs 61 of a slide frame 62 the upper edge of which has a projecting lip 63 which rests slidably on a guide member 64. The rear part of the slide frame 62 is inclined to the front part so as to hold the photographic plates at appropriate angles in relation to the mirrors 26, 27 and screen 25. In the upper part is a second slide 65 engaged by a screw 66 connected by universal joint 67 to an operating rod 68 and knob 69 whereby the slide 65 can be moved up and down the slide frame 62. Slide 65 carries a pivot pin 71 on which is a tilting plate 72 provided with a curved rack 73 engaged by a screw 74 operable by a knob 75. The tilting plate carries a plate holder 77 adjustable laterally by screw 79 and provided with a clip 80 for holding the standard photographic plate.

The lower part of the frame 62 carries similar parts for holding the photographic plate to be examined, viz. second slide 85 engaged by screw 86 operated by a knob 87; pivot pin 88, tilting plate 89, curved rack 90, screw 91 having a knob 92; plate holder 93, screw 94; and plate clip 95.

The frame 62 is adjustable laterally by knob 100, reduction gear 101, pinion 102, and rack 103.

Figure 9:
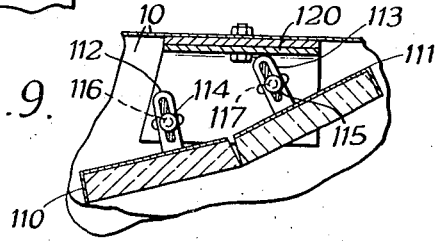
Figure 9 is an enlarged view of another part of Figure 3.

The mirrors 26, 27 may be thick glass with optically flat aluminium-covered surfaces. They are mounted in holders 110, 111 (Figure 9) carried by slotted lugs 112, 113 mounted on threaded bars 116, 117 and clamped in adjusted positions by wing nuts 114, 115, the bars being mounted in a holder 120 carried on the upper part of the frame 10.

The lamps 11, 14 are mounted on a structure 122 and a fan 123 draws air through the lamp housings 124, 125 and through the structure 122 for cooling.

The projector lenses 13, 16 are placed in lens holders 130, 131 carried by a bracket 132, the lower end of which is supported by rods 133, 134 and the upper end of which is bolted to the frame 10.

The plate supporting slides face upwardly and forwardly and the mirrors 26, 27 are mounted above them and forwardly thereof. The screen 25 is horizontal or nearly horizontal but may be at a small angle to the horizontal.

We claim:

1. A spectrographic analysis apparatus comprising a viewing screen, means for mounting a plate having spectrum lines thereon, an optical system for projecting a magnified image of said spectrum lines on said screen, means for mounting a second plate having spectrum lines thereon, an optical system for projecting a second magnified image of the spectrum lines on said second plate on said screen, a slit in said screen disposed parallel to said spectrum line images, adjustable means for positioning a line of said first image in juxtaposed alignment with a line of said second image, adjustable means for superimposing one of said spectrum line images over said slit, means for reciprocating said screen transversely of said superimposed line image, the length of travel of said screen being greater than the width of said superimposed line image whereby said slit will move from one side of said superimposed line image beyond the opposite side and return, a light sensitive device disposed in the path of light passing through said slit, a cathode ray oscilloscope having vertical and horizontal input circuits, said reciprocating means being connected to the horizontal input circuit of said oscilloscope to provide a time base and the output of said light sensitive device being connected to the vertical input circuit of said oscilloscope whereby the height of the pattern on the screen of said oscilloscope will indicate the density of said superimposed line image with respect to the position of said slit.

2. A spectrographic analysis apparatus as defined in claim 1 in which adjustable means is provided on said viewing screen for varying the length of said slit.

References Cited in the file of this patent

UNITED STATES PATENTS

| | | |
|---|---|---|
| 2,324,270 | Schlesman | July 13, 1943 |
| 2,436,104 | Fisher et al. | Feb. 17, 1948 |
| 2,480,636 | Dieke | Aug. 30, 1949 |
| 2,602,368 | Barnes | July 8, 1952 |
| 2,630,736 | Beitz | Mar. 10, 1953 |
| 2,656,757 | Stern | Oct. 27, 1953 |

OTHER REFERENCES

"The New Density Comparator," Bausch & Lomb Optical Co., publication D-215, 8, X-34, March 1935.

"A New Microphotometer," Vincent et al., Journal of the Optical Society of America, vol. 31, pages 639-643, October 1941.